UNITED STATES PATENT OFFICE.

HANS SCHNEIDER, OF HAMBURG, GERMANY.

METHOD OF MAKING DIPHENYL-ORTHO-OXALIC ESTERS.

942,674.

Specification of Letters Patent. Patented Dec. 7, 1909.

No Drawing. Application filed January 28, 1909. Serial No. 474,676.

*To all whom it may concern:*

Be it known that I, HANS SCHNEIDER, doctor of philosophy, chemist, a subject of the German Emperor, and resident of Hamburg, Germany, (whose post-office address is Moorfuhrtweg 13/15,) have invented new and useful Methods of Making Diphenyl-Ortho-Oxalic Esters, of which the following is a specification.

My invention relates to a new method for manufacturing diphenyl-ortho-oxalic ester, which I have found to be a disinfectant of higher power than carbolic acid; it can be pressed in tablets, which have an unlimited durability against climatical influences; it is always ready for use as it needs only to be dissolved in water.

My new method differs from the known methods in that it allows of manufacturing the ester in a very cheap and simple manner, in so far as no distillation nor use of any solvent such as glacial acetic acid becomes necessary.

Example: Over 375 grms. of anhydrous oxalic acid powder are poured 750 grms. of liquefied pure carbolic acid at about 40°.C., and thoroughly stirred. The mass which is at first thinly fluid, becomes gradually thicker during the stirring without, however, any reaction of the substances contained therein on each other becoming noticeable. Only after the mixture is of the consistency of a fairly thick porridge does a self heating begin. The temperature of the mixture rises then fairly quickly from about 30° C. to nearly 100° C., and there is left a white, perfectly dry mass consisting of phenol oxalic acid ester. This mass can be compressed directly into tablets. The tablets exercise very little or scarcely any corrosive action, on the skin, and thus differ favorably from the pure carbolic acid. The ester is formed in quantitatively and of nearly perfect purity, so that it can be used directly as a disinfectant either in the form of powder or compressed into tablets. The melting point of the pure ester is 122°–124° C.

Phenostal or diphenyl-ortho-oxalic acid ester forms a white powder with a weak smell of carbolic acid. It contains in round numbers 68% carbolic acid and 32% oxalic acid. It is easily soluble in water and alcohol. When dissolved it decomposes into phenol and oxalic acid or phenol and oxalic ethyl ether. Phenostal is also soluble in ether, acetone, acetic acid and acetic acid anhydrid. It is possible to crystallize it again from glacial acetic acid. Benzin, benzol, and chloroform dissolve phenostal with difficulty; the aqueous solutions are strongly sour. The melting point lies near 124° C. Its identity is established by showing its components and typical reactions. If the aqueous solution is mixed with ammonia and chlorid of calcium or lime water a white precipitate is formed, which is not soluble in acetic acid, but soluble in mineral acids. If phenostal is dissolved in acetone or alcohol and a little anilin is added to this solution a white anilin oxalate is formed which is soluble with difficulty; if the solution is exactly neutralized by ammonia, and to this solution chlorid of iron is added, the typical blue reaction for phenol takes place. If the aqueous solution is mixed with a solution of a sodium salt of sulfanilic acid and sodium nitrate is added, the solution is colored yellow; on the addition of sodium carbonate the solution is colored intensely orange.

The following equation represents the reaction which occurs:

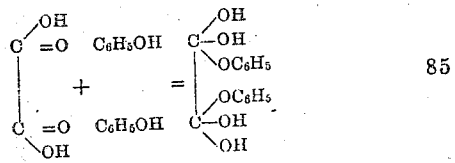

I claim:—

1. A process for manufacturing diphenyl-ortho-oxalic ester consisting in stirring anhydrous oxalic acid together with liquefied phenol, substantially as described.

2. A process for manufacturing diphenyl-ortho-oxalic ester consisting in stirring anhydrous oxalic acid together with liquefied phenol in the proportion of one molecule of anhydrous oxalic acid to two molecules of phenol, substantially as described.

3. A process for manufacturing diphenyl-ortho-oxalic ester consisting in stirring anhydrous oxalic acid together with liquefied phenol at a temperature below the vaporizing point of either constituent.

4. A process for manufacturing diphenyl-ortho-oxalic ester consisting in stirring anhydrous oxalic acid together with liquefied phenol thoroughly until the temperature rises and the reaction is completed.

In testimony that I claim the foregoing as my invention, I have signed my name in presence of two witnesses, this eleventh day of January 1909.

HANS SCHNEIDER.

Witnesses:
 ERNEST H. L. MUMMENHOFF,
 OTTO W. HELLMRICH.